United States Patent
Iwasa et al.

(10) Patent No.: US 9,563,435 B2
(45) Date of Patent: Feb. 7, 2017

(54) INFORMATION PROCESSING SYSTEM, INFORMATION PROCESSING APPARATUS AND START UP CONTROL METHOD

(71) Applicants: Keisuke Iwasa, Kanagawa (JP); Tadashi Nagata, Kanagawa (JP); Yoh Masuyama, Kanagawa (JP)

(72) Inventors: Keisuke Iwasa, Kanagawa (JP); Tadashi Nagata, Kanagawa (JP); Yoh Masuyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 256 days.

(21) Appl. No.: 14/258,060

(22) Filed: Apr. 22, 2014

(65) Prior Publication Data
US 2014/0325199 A1    Oct. 30, 2014

(30) Foreign Application Priority Data
Apr. 30, 2013  (JP) ................................ 2013-095463

(51) Int. Cl.
G06F 9/44    (2006.01)
G06F 1/32    (2006.01)

(52) U.S. Cl.
CPC ........... *G06F 9/4401* (2013.01); *G06F 1/3206* (2013.01)

(58) Field of Classification Search
None
See application file for complete search history.

(56) References Cited

U.S. PATENT DOCUMENTS

| | | | |
|---|---|---|---|
| 7,352,980 B2 | 4/2008 | Kato et al. | |
| 7,706,709 B2 | 4/2010 | Okamoto et al. | |
| 8,234,486 B2 * | 7/2012 | Bernardini | G06F 9/4418 713/2 |
| 2004/0098578 A1 * | 5/2004 | Funayama | G06F 1/3203 713/2 |
| 2006/0061563 A1 * | 3/2006 | Fleck | G06F 1/1616 345/211 |
| 2007/0016809 A1 | 1/2007 | Kida et al. | |
| 2007/0213844 A1 * | 9/2007 | Aoki | G06F 9/485 700/11 |

(Continued)

FOREIGN PATENT DOCUMENTS

EP   2528314 A1   11/2012
JP   2006-003659   1/2006

(Continued)

OTHER PUBLICATIONS

Extended European Search Report dated Dec. 2, 2014.

*Primary Examiner* — Paul Yanchus, III
*Assistant Examiner* — Paul J Yen
(74) *Attorney, Agent, or Firm* — Harness, Dickey & Pierce, P.L.C.

(57) ABSTRACT

An information processing system includes an operation part that receives an operation performed by a user; and a body part that operates based on a request from the operation part. The operation part includes a power control part that, when receiving a power turning off instruction from the body part, reboots the operation part and causes the operation part to stand by in a power saving state in which some of operations are stopped, and, when receiving a start up notification from the body part, causes the operation part to return from the power saving state.

9 Claims, 8 Drawing Sheets

(56) References Cited

U.S. PATENT DOCUMENTS

| | | | |
|---|---|---|---|
| 2010/0218017 A1* | 8/2010 | Kitajima | G06F 1/3209 |
| | | | 713/320 |
| 2012/0159212 A1 | 6/2012 | Takatani et al. | |
| 2012/0236353 A1 | 9/2012 | Nagayama | |
| 2013/0010318 A1 | 1/2013 | Goda | |
| 2013/0103964 A1* | 4/2013 | Peveling | G06F 1/305 |
| | | | 713/323 |

FOREIGN PATENT DOCUMENTS

| | | |
|---|---|---|
| JP | 2007-004053 | 1/2007 |
| JP | 2007-025877 | 2/2007 |
| JP | 4366272 | 11/2009 |
| JP | 2010-034626 | 2/2010 |
| JP | 2012-155534 | 8/2012 |
| JP | 2012-213133 | 11/2012 |
| JP | 5195136 | 5/2013 |
| JP | 5292213 | 9/2013 |

\* cited by examiner

INFORMATION PROCESSING SYSTEM, INFORMATION PROCESSING APPARATUS AND START UP CONTROL METHOD

BACKGROUND OF THE INVENTION

1. Field of the Invention

The present invention relates to an information processing system, an information processing apparatus and a start up control method.

2. Description of the Related Art

An image forming apparatus is known in which when a copy mode is selected in a sleep mode, a fixing part enters a standby state from a sleep state. Then, a thermal fixing process can be carried out only by heating the fixing part from the standby state to a fixing state. Thus, it is possible to carry out a copy operation rapidly (Japanese Laid-Open Patent Application No. 2007-4053).

SUMMARY OF THE INVENTION

According to one aspect of the present invention, an information processing system includes an operation part that receives an operation performed by a user; and a body part that operates based on a request from the operation part. The operation part includes a power control part that, when receiving a power turning off instruction from the body part, reboots the operation part and causes the operation part to stand by in a power saving state in which some of operations are stopped, and, when receiving a start up notification from the body part, causes the operation part to return from the power saving state.

Other objects, features and advantages of the present invention will become more apparent from the following detailed description when read in conjunction with the accompanying drawings.

DETAILED DESCRIPTION OF THE EMBODIMENTS

First, for the sake of convenience of explanation, a problem to be solved by the embodiment will be described.

In an information processing system in the related art, in order to avoid degradation in the operation response although the load in a body part is high, it is considered to separate an operation part from the body part, the operation part being used for displaying a screen page and/or receiving key inputs. For example, an operating system (OS) independent from the body part can be installed in the operation part and the operation part can operate independently from the body part.

However, in such an information processing system in which an operation part is separated from a body part, the operation part cannot receive a request from a user for using a function of the body part until the operation part is started up. On the other hand, as long as the operation part has been already started up, the operation part can receive a request from a user even before the body part has been ready. Thus, by reducing a time required for the operation part becoming usable, it is possible to give a user an impression that the information processing system requires a reduced start up time.

The embodiment of the present invention has been devised in consideration of this point, and an objective of the embodiment is to provide an information processing system, an information processing apparatus and a start up control method by which it is possible to reduce a time required for an operation part becoming usable.

Next, the embodiment of the present invention will be described in detail. Note that, in the embodiment, an image processing apparatus will be described as one example of an information processing system.

System Configuration

Figure 1:
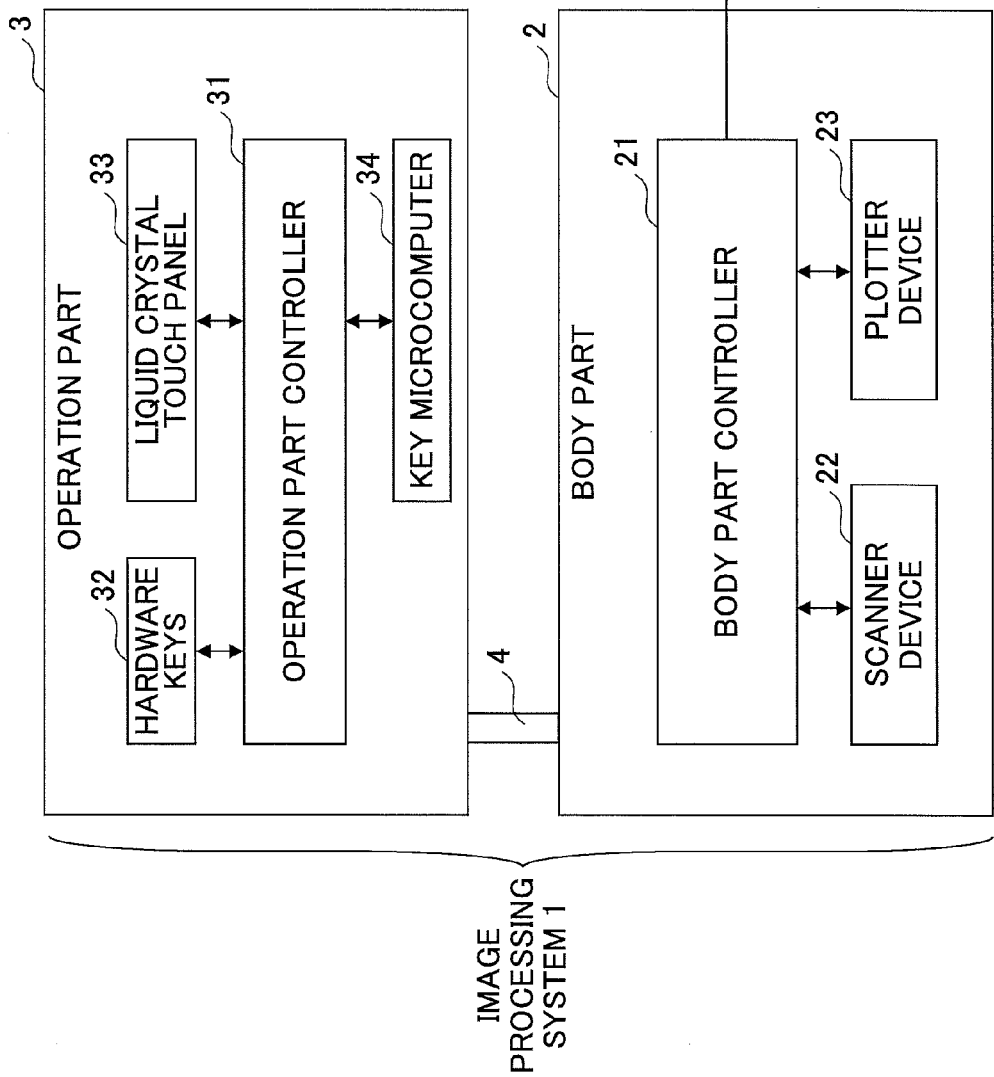
FIG. 1 is a configuration diagram of one example of an image processing apparatus according to one embodiment.

FIG. 1 is a configuration diagram of one example of an image processing apparatus according to the embodiment.

In FIG. 1, an image processing apparatus 1 includes a body part 2 and an operation part 3 which are connected by a cable 4 in such a manner that data communication can be carried out therebetween. Note that the body part 2 and the operation part 3 can be connected wirelessly (including infrared rays) instead of a wired connection by the cable 4.

The body part 2 has a body part controller 21, a scanner device 22 and a plotter device 23. The body part controller 21 controls operations of the body part 2. The scanner device 22 reads image information from an original. The plotter device 23 carries out printing on a sheet of paper.

Note that the body part 2 can receive access from a terminal apparatus 6 such as a Personal Computer (PC) via a network 5 such as a Local Area Network (LAN), a Wide Area Network (WAN) or the Internet. Also the body part 2 can receive access from a terminal apparatus 8 such as a smartphone or a tablet via a wireless access point 7 connected with the network 5. Also such a configuration can be provided that the terminal apparatus 8 directly accesses the body part 2 using short distance wireless communication such as Bluetooth (registered trademark).

The operation part 3 has an operation part controller 31, hardware keys 32, a liquid crystal touch panel 33 and a key microcomputer 34. The operation part controller 31 controls operations of the operation part 3. The hardware keys 32 receive an operation performed by a user. The liquid crystal touch panel 33 carries out display on a screen and receives operation inputs. The key microcomputer 34 receives a start up notification from the body part 2, confirms starting up of the body part 2, and so forth. Note that receiving a start up notification from the body part 2 and confirming starting up of the body part 2 will be described later.

Figure 2:
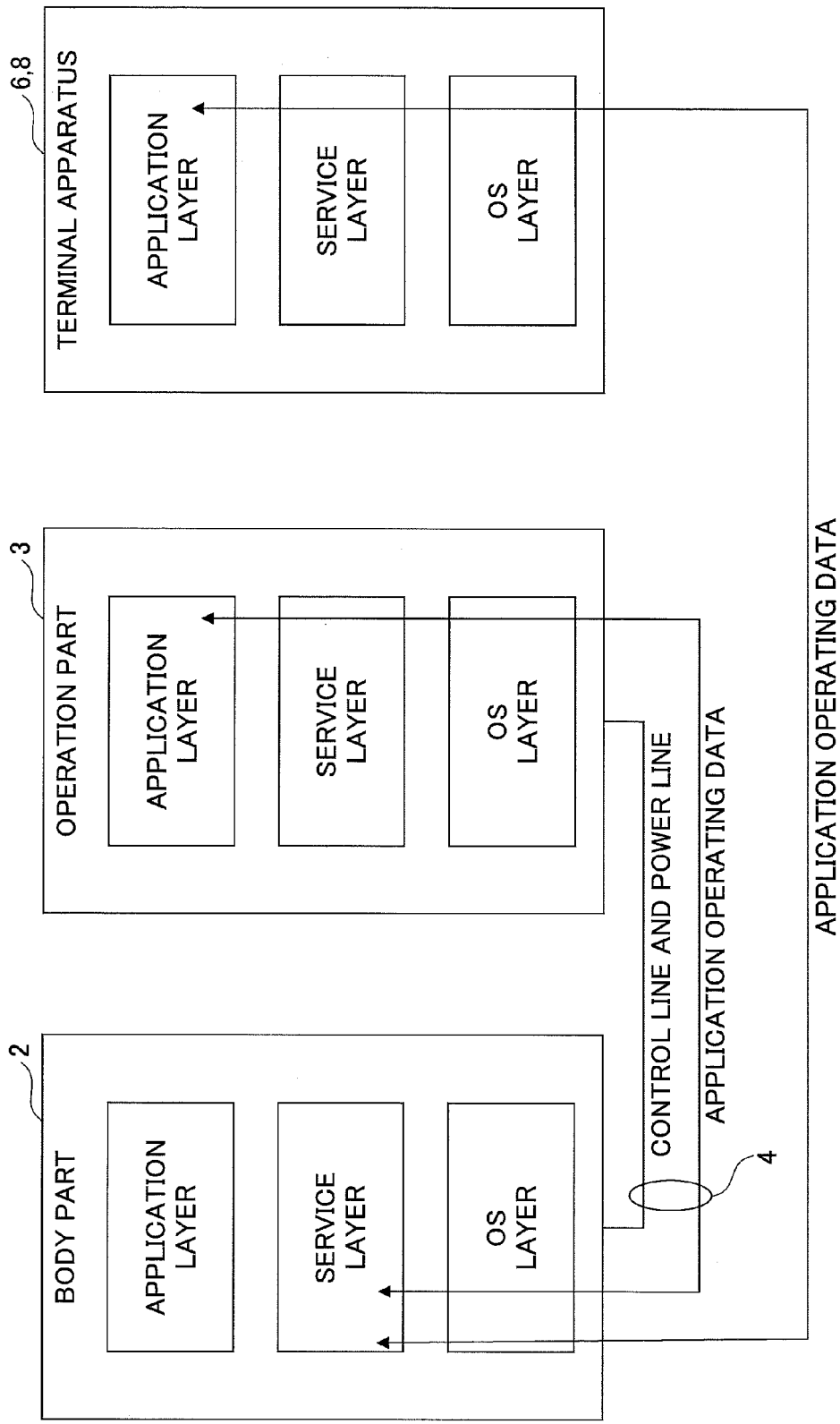
FIG. 2 illustrates one example of a flow of application operating data used when an operation part or a terminal apparatus uses a function of a body part.

FIG. 2 illustrates one example of a flow of application operating data used when the operation part 3 or the terminal apparatus 6 or 8 uses a function of the body part 2. In FIG. 2, the cable 4 provides a control line and a power line from the body part 2 to the operation part 3. Application operating data from an application layer of the operation part 3 is transmitted to a service layer of the body part 2 via the cable 4. Application operating data from an application layer of the terminal apparatus 6 or 8 is transmitted to the service layer of the body part 2 via the network 5.

Figure 3:
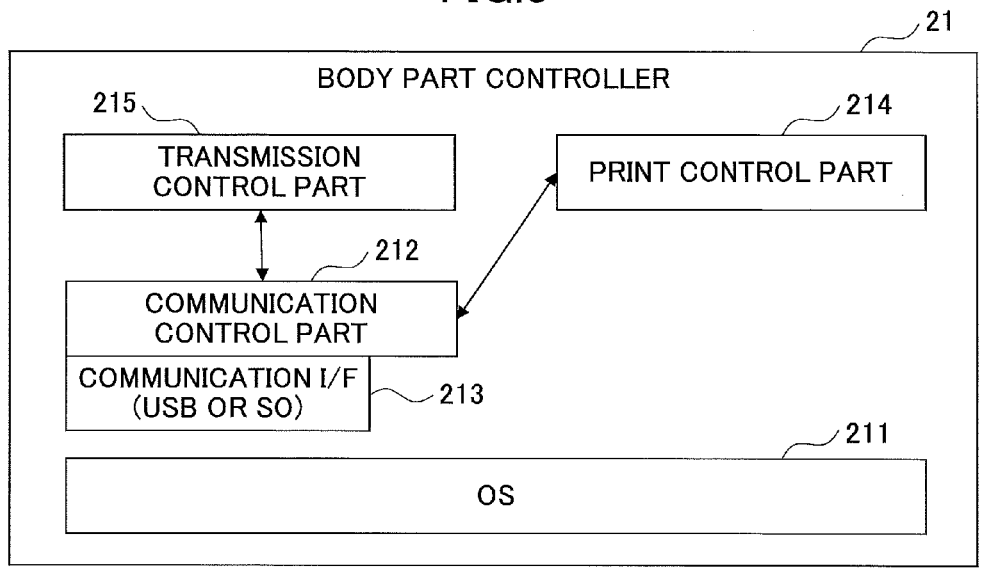
FIG. 3 is a configuration diagram of one example of a body part controller according to the embodiment.

FIG. 3 is a configuration diagram of one example of the body part controller 21 according to the embodiment. The body part controller 21 in the body part 2 has an OS 211, a communication control part 212, a communication I/F 213, a print control part 214 and a transmission control part 215.

The OS 211 is basic software of the body part controller 21. The communication control part 212 has a function of controlling data communication with the operation part 3 or the terminal apparatus 6 or 8 via the communication I/F 213. The communication control part 212 transfers data received from the outside to the print control part 214 or the transmission control part 215, and transmits data received from the print control part 214 or the transmission control part 215 to the outside. The communication I/F 213 is a communication device for Universal Serial Bus (USB) communication, serial communication, communication using a wired or wireless LAN, Bluetooth, Infrared Data Association (IrDA) or the like.

The print control part 214 has a function of controlling the scanner device 22, the plotter device 23 or the like, and managing a print job. Also, the print control part 214 uses the communication control part 212 and sends a request to an operating information input and output part 314, described later, for displaying an operation screen page, or the like. The transmission control part 215 has a function of managing a transmission job such as mail transmission or folder transmission.

Figure 4:
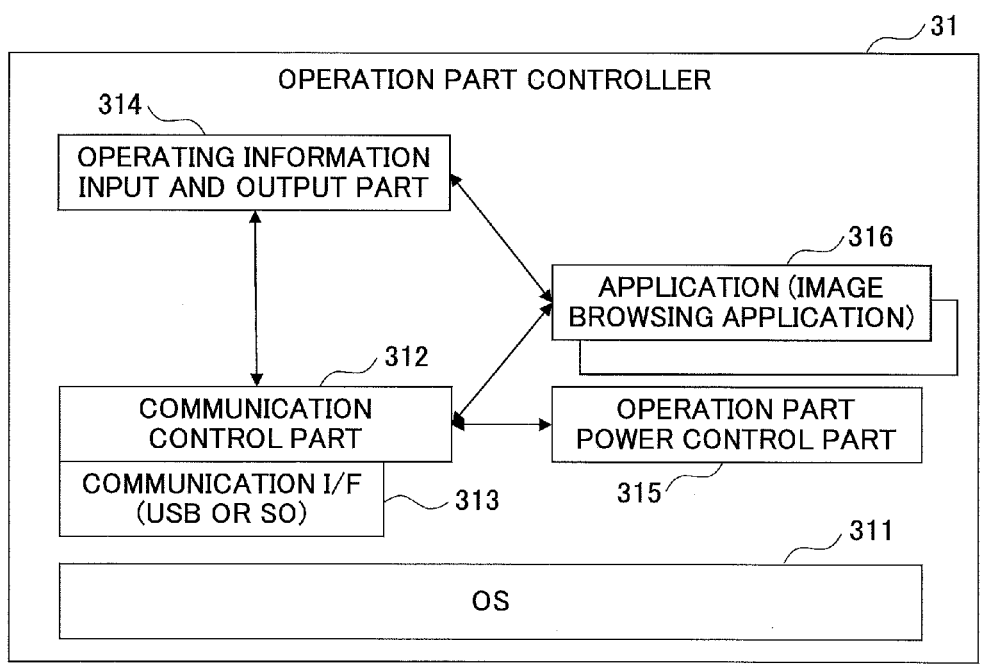
FIG. 4 is a configuration diagram of one example of an operation part controller according to the embodiment.

FIG. 4 is a configuration diagram of one example of the operation part controller 31 according to the embodiment. The operation part controller 31 in the operation part 3 has an OS 311, a communication control part 312, a communication I/F 313, the operating information input and output part 314, an operation part power control part 315 and various applications 316.

The OS 311 is basic software of the operation part controller 31. Thus, the OS 311 independent from the body part 2 is installed in the operation part controller 31 and the operation part controller 31 can operate independently from the body part 2. For example, an Android OS can be used as the OS 311.

The communication control part 312 has a function of controlling data communication with the body part 2 via the communication I/F 313. The communication control part 312 transfers data received from the outside to the operating information input and output part 314, the operation part power control part 315 or the applications 316, and transmits data received from the operating information input and output part 314, operation part power control part 315 or the applications 316 to the outside. Also, the communication I/F 313 is a communication device for USB communication, serial communication, communication using a wired or wireless LAN, Bluetooth, IrDA or the like.

The operating information input and output part 314 has functions of displaying a screen page to a user using the liquid crystal touch panel 33, and also, receiving an operation performed by a user through the hardware keys 32 or the liquid crystal touch panel 33.

The operation part power control part 315 reboots the operation part 3, or causes the operation part 3 to enter a sleep state or return from the sleep state. The operation part power control part 315 can receive a start up notification from the body part 2, confirm starting up of the body part 2, or the like, described later, by using the key microcomputer 34 even in a sleep state. A "sleep state" means a state of standing by in a power saving state in which some of operations are stopped. Further, the applications 316 are application programs such as an image viewing application operating in the operation part 3 and/or the like.

Note that the body part 2 and the operation part 3 can be provided in the same housing or in respective separate housings. For example, it is possible to implement such a use form as using the operation part 3 in a state where the operation part 3 is separate from the body part 2, by wirelessly connecting the operation part 3 separable from the body part 2 and the body part 2.

Figure 5:
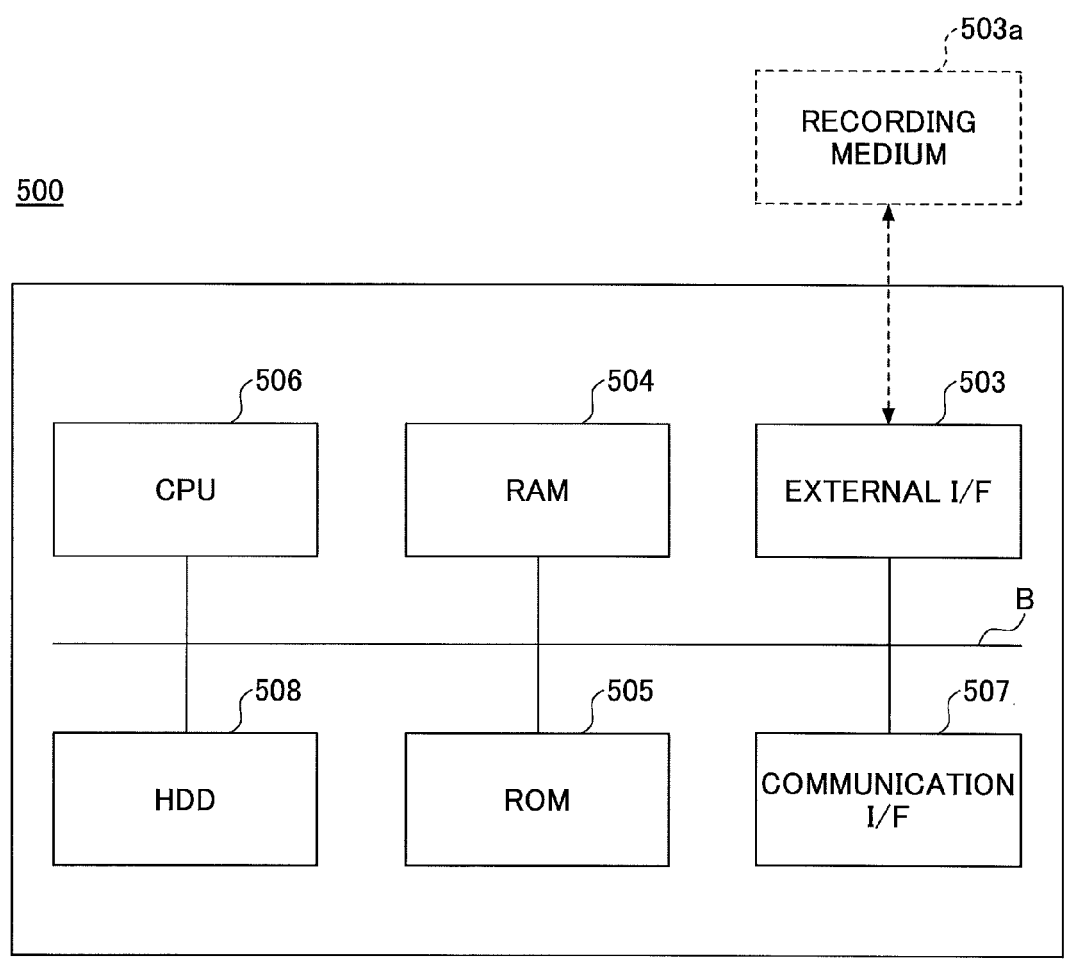
FIG. 5 is a hardware configuration diagram of one example of a computer.

FIG. 5 is a hardware configuration diagram of one example of a computer. Each of the body part controller 21 in FIG. 3 and the operation part controller 31 in FIG. 4 is implemented as a result of, for example, a computer 500 having a hardware configuration shown in FIG. 5 executing a program(s).

The computer 500 shown in FIG. 5 has an external I/F 503, a Random Access Memory (RAM) 504, a Read Only Memory (ROM) 505, a Central Processing Unit (CPU) 506, a communication I/F 507, a Hard Disk Drive (HDD) 508 and so forth, and they are mutually connected by a bus B.

The communication I/F 507 corresponds to the above-mentioned communication I/F 213 or 313. The HDD 508 is a nonvolatile storage device storing a program(s) and data. Note that the stored program(s) and data include an OS that is basic software controlling the entirety of the computer 500 and an application program(s) in the application layer and/or a service program(s) in the service layer operating on the OS and providing various functions. The HDD 508 manages the stored program(s) and data using a predetermined file system and/or DataBase (DB).

The external I/F 503 is an interface for an external device(s). The external device(s) can include a recording medium 503a and/or the like. Thus, the computer 500 can read information from and write information into the recording medium 503a via the external I/F 503. The recording medium 503a can be a flexible disk, a Compact Disk (CD), a Digital Versatile Disk (DVD), a SD memory card, a USB memory or the like.

The ROM 505 is a nonvolatile semiconductor memory (storage device) that can store a program(s) and data even after the power is turned off. The ROM 505 stores a program(s) and data such as a Basic Input/Output System (BIOS) executed when the computer 500 is started, OS settings, network settings and/or the like. The RAM 504 is a volatile semiconductor memory (storage device) that can temporarily store a program(s) and/or data.

The CPU 506 reads a program(s) and/or data from a storage device such as the ROM 505 or the HDD 508 to the RAM 504, executes a process(es) and thus controls the entirety of the computer 500 and implements a function(s).

The body part controller 21 and the operation part controller 31 can implement various processes described later by executing programs in respective computers such as the computer 500 having the above-mentioned hardware configuration.

Details of Processes

In the image processing apparatus 1 according to the embodiment, when shutting down occurs, the operation part 3 is started up through being rebooted and enters a sleep state for standing by for subsequent starting up. In the image processing apparatus 1 according to the embodiment, the operation part 3 thus enters a sleep state for standing by for subsequent starting up. Thus, it is possible to use the operation part 3 through returning the operation part 3 from the sleep state. Therefore, in the image processing apparatus 1 according to the embodiment, in comparison to usual starting up carried out after the power is turned on, it is possible to reduce a time required for the operation part 3 becoming usable. Note that "shutting down" means causing the system to end operations and turning the power off.

Shutting Down

Figure 6:
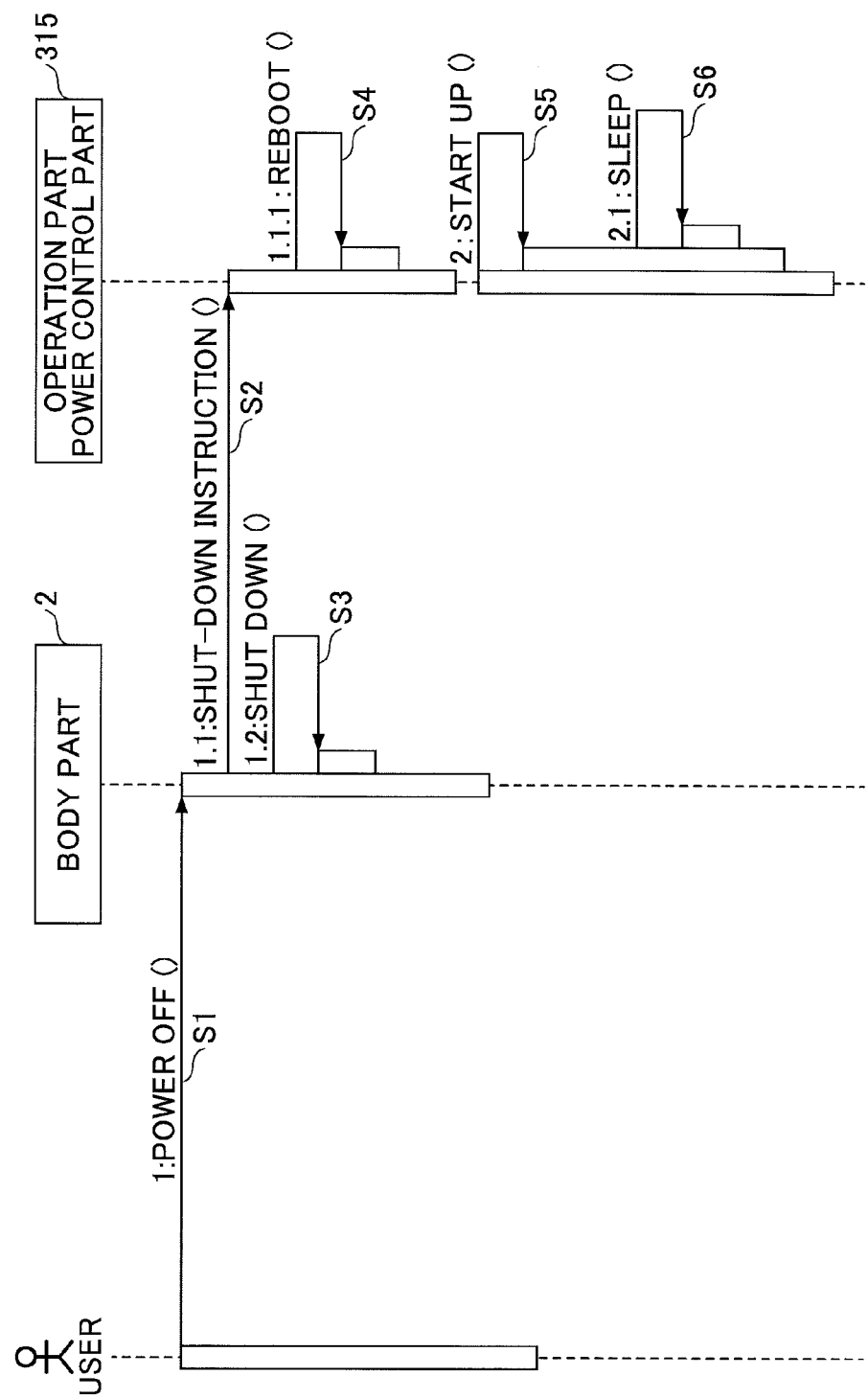
FIG. 6 is a sequence diagram showing one example of processes carried out at a time of shutting down.

FIG. 6 is a sequence diagram showing one example of processes carried out at a time of shutting down. In step S1, a user operates, for example, a power switch provided on the body part 2 to turn the power off. In step S2, the body part 2 sends a shut-down instruction to the operation part power control part 315 of the operation part 3. Further, the body part 2 shuts itself down in step S3.

The operation part power control part 315 in the operation part 3 receives the shut-down instruction from the body part 2 and reboots the operation part 3 instead of shutting it down. Thereafter, in step S5, the operation part 3 is started up through being rebooted. The operation part power control part 315 in the operation part 3 thus started up through being rebooted causes the operation part 3 to enter a sleep state in step S6.

Thus, in the image processing apparatus 1 according to the embodiment, the operation part 3 that receives a shut-down instruction from the body part 2 does not shut itself down and enters a sleep state after being started up through being rebooted. As a result of being rebooted, the operation part 3 enters a state equivalent to a state obtained from shutting down. Thus, also setting values and so forth held at a time of starting up are reset in the same way as a time of shutting down.

Note that, from a viewpoint of reducing a time required for the operation part 3 becoming usable in comparison to a case of starting up after the power is turned on, such a configuration can be provided that the operation part power control part 315 of the operation part 3 is not rebooted and causes the operation part 3 to enter a sleep state. Hereinafter, starting up of the operation part 3 from a sleep state will be referred to as "quick boot".

Further, in the image processing apparatus 1 according to the embodiment, after being operated to turn the power off, the operation part 3 is started up through being rebooted. In consideration of a user's convenience, such a configuration can be provided that, no display is carried out on a screen during starting the operation part 3 through being rebooted; and the operation part 3 shows, by turning on an LED or the like, to a user the state of preparing for quick boot (currently carrying out a process to enter a sleep state).

Starting Up

Figure 7:
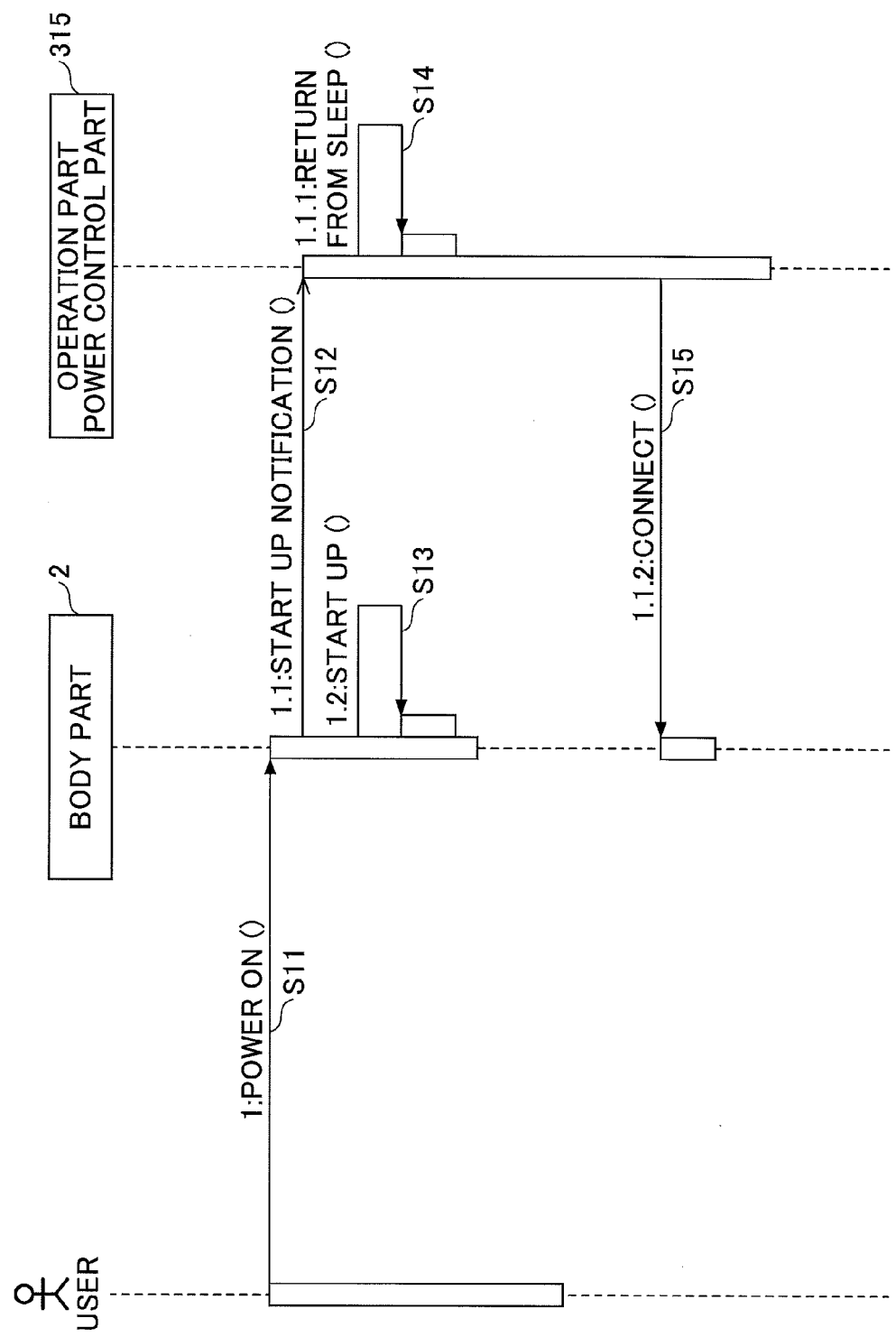
FIG. 7 is a sequence diagram showing one example of processes carried out at a time of starting up.

FIG. 7 is a sequence diagram showing one example of processes carried out at a time of starting up. In step S11, a user operates, for example, the power switch provided on the body part 2 to turn the power on. In step S12, the body part 2 sends a start up notification to the operation part power control part 315 of the operation part 3. In step S13, the body part 2 begins starting up itself.

The operation part power control part 315 receives the start up notification from the body part 2 and causes the operation part 3 to return from the sleep state in step S14. After returning from the sleep state in step S14, the operation part 3 is in a state of being able to receive an operation performed by a user.

Then, the body part 2 finishes the starting up. In step S15, the operation part power control part 315 connects itself with the body part 2 so as to create a state where the body part 2 and the operation part 3 are mutually communicatable. After the connection in step S15, the operation part 3 is in a state of being able to use a function of the body part 2.

Thus, in the image processing apparatus 1 according to the embodiment, at a time of shutting down the body part 2, the operation part 3 finishes starting up itself and stands by in a sleep state. Therefore, it is possible to reduce a time required from when a user turns on the power to when the user can actually use the operation part 3.

Power Turned on During Preparation for Quick Boot

In the image processing apparatus 1 according to the embodiment, there is a probability that, while the operation part 3 is preparing for quick boot, a user turns on the power of the body part 2. In such a case, the operation part 3 connects itself with the body part 2 when the preparation for quick boot is completed, as shown in FIG. 8.

Figure 8:
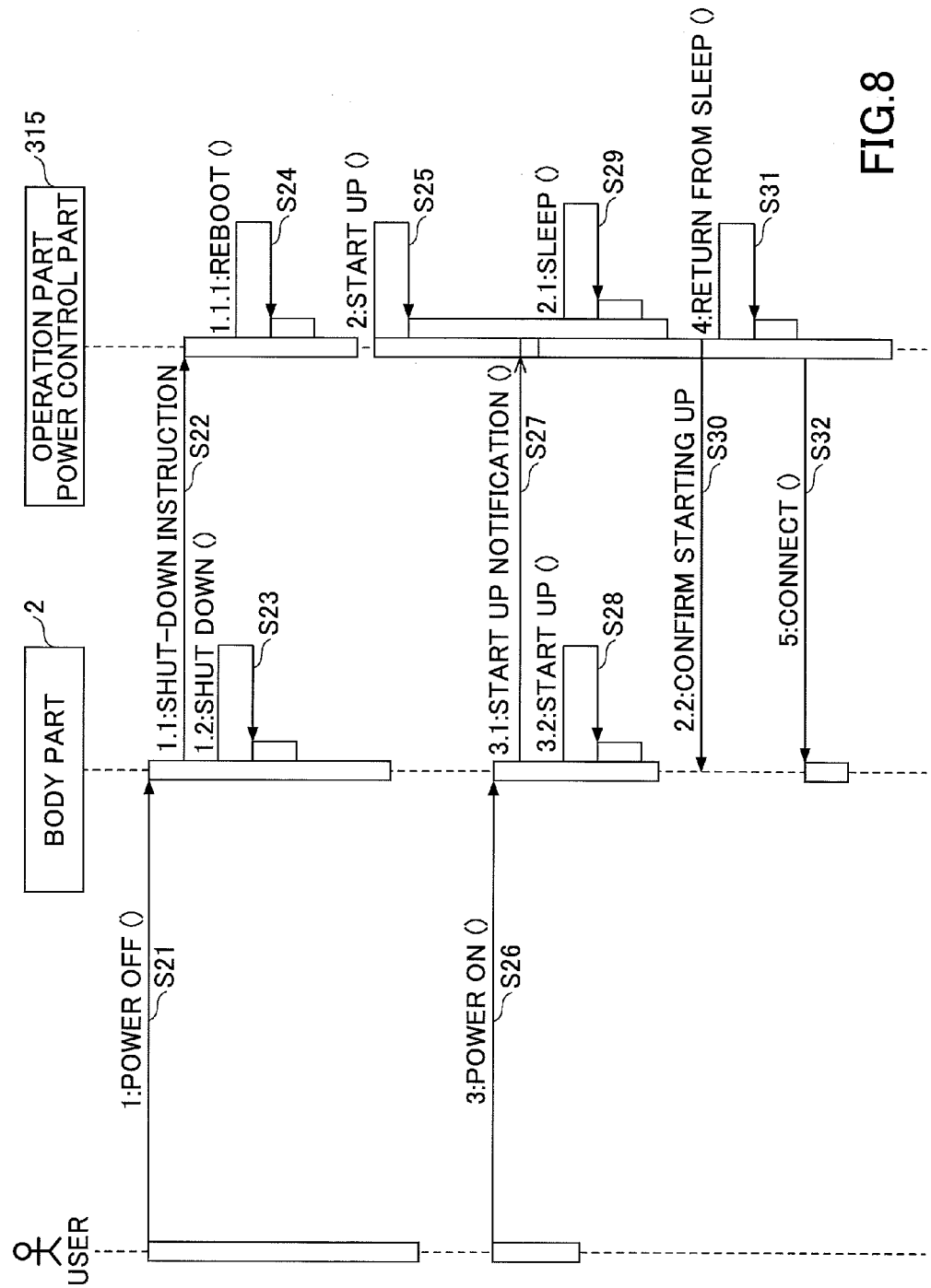
FIG. 8 is a sequence diagram showing one example of processes carried out at a time of starting up when the power is turned on in the body part during a preparation for quick boot.

FIG. 8 is a sequence diagram showing one example of processes carried out at a time of starting up when the power is turned on in the body part 2 during a preparation for quick boot. Note that processes in step S21 to S25 are the same as those in steps S1 to S5 of FIG. 6, and therefore, duplicate description will be omitted.

In step S26, a user turns on the power of the body part 2, and at this time, it is assumed that the operation part 3 has not yet entered a sleep state. In step S27, the body part 2 sends a start up notification to the operation part power control part 315 of the operation part 3. Also, in step S28, the body part 2 begins starting up itself.

Note that since the operation part power control part 315 is currently preparing for quick boot when receiving the start up notification in step S27, the operation part power control part 315 ignores the start up notification. Thereafter, in step S29, the operation part 3 completes being started up through being rebooted. The operation part power control part 315 of the operation part 3 thus started up through being rebooted causes the operation part 3 to first enter a sleep state.

In step S30, after the operation part 3 enters a sleep state, the operation part power control part 315 confirms whether starting up of the body part 2 is begun. When the operation part power control part 315 confirms that starting up of the body part 2 is begun, the operation part power control part 315 causes the operation part 3 to return from the sleep state in step S31. After returning from the sleep state in step S31, the operation part 3 is in a state of being able to receive an operation performed by a user.

Then, the body part 2 finishes the starting up. In step S32, the operation part power control part 315 connects itself with the body part 2 so as to create a state where the body part 2 and the operation part 3 are mutually communicatable. After the connection in step S32, the operation part 3 is in a state of being able to use a function of the body part 2.

Thus, in the image processing apparatus 1 according to the embodiment, even when a user turns on the power of the body part 2 while the operation part 3 is currently preparing for quick boot, the image processing apparatus 1 can normally start up itself.

Figure 9:
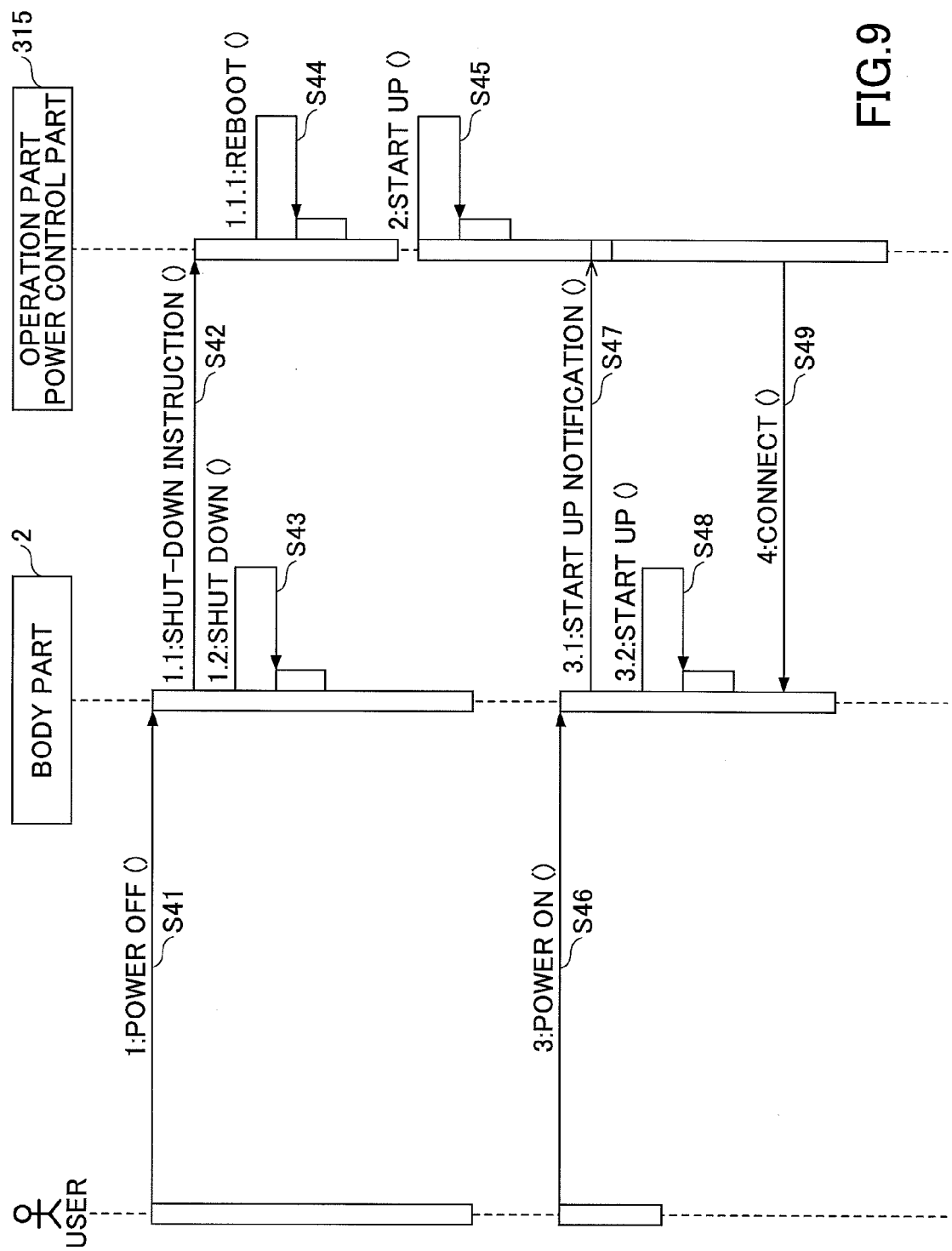
FIG. 9 is a sequence diagram showing another example of processes carried out at a time of starting up when the power is turned on in the body part during a preparation for quick boot.

Alternatively, in the image processing apparatus 1 according to the embodiment, it is also possible to provide a configuration such that, when a user turns on the power of the body part 2 while the operation part 3 is currently preparing for quick boot, the preparing for quick boot is interrupted and the operation part 3 is connected with the body part as shown in FIG. 9.

FIG. 9 is a sequence diagram showing another example of processes carried out at a time of starting up when the power is turned on in the body part 2 during preparation for quick boot. Note that processes in step S41 to S48 are the same as those in steps S21 to 28 of FIG. 8, and therefore, duplicate description will be omitted.

The operation part power control part 315 that receives the start up notification from the body part 2 in step S47 interrupts the preparing for quick boot. Then, the body part 2 finishes the starting up and the operation part 3 finishes being started up through being rebooted. In step S49, the operation part power control part 315 connects itself with the body part 2 so as to create a state where the body part 2 and the operation part 3 are mutually communicatable. After the connection in step S49, the operation part 3 is in a state of being able to use a function of the body part 2.

Thus, in the image processing apparatus 1 according to the embodiment, when the processes of starting up shown in the sequence diagram of FIG. 9 are carried out, it is possible to reduce a time required until a user can use the operation part 3 from when the user turns on the power in comparison to the processes of starting up shown in the sequence diagram of FIG. 8, since a time that would be required for continuing the preparing for quick boot after the interruption is omitted.

SUMMARY OF THE EMBODIMENT

According to the embodiment, when the image processing apparatus 1 is shut down, the operation part 3 is not shut down and is caused to stand by in a sleep state. Therefore, it is possible to reduce a time required until a user can use the operation part 3 from when the user turns on the power.

For example, when the operation part 3 is usable, the user can start using the operation part 3 even when preparation has not yet finished in the body part 2 (i.e., even when the body part 2 has not yet completed starting up itself). For example, in each of the sequence diagrams of FIGS. 7 and 8, the user can start using the operation part 3 after the operation part 3 returns from the sleep state (step S14 or S31) even before the operation part 3 is connected with the body part 2 (step S15 or S32). Then, an instruction that is thus input to the operation part 3 by the user is sent to the body part 2 after the operation part 3 is connected with the body part 2 (step S15 or S32) and a corresponding image processing result is thus provided by the body part 2. Similarly, in the sequence diagram of FIG. 9, the user can start using the operation part 3 after the operation part 3 is started up (step S45) even before the operation part 3 is connected with the body part 2 (step S49). Then, an instruction that is thus input to the operation part 3 by the user is sent to the body part 2 after the operation part 3 is connected with the body part 2 (step S49) and a corresponding image processing result is thus provided by the body part 2. Therefore, it is possible to give a user an impression that the image processing apparatus 1 requires a reduced start up time. As a result, in the image processing apparatus 1 according to the embodiment, the performance at a time of starting up is improved.

Thus, the information processing system, the information processing apparatus and the start up control method have been described in the embodiment. However, the present invention is not limited to the specifically disclosed embodiment and variations and modifications may be made without departing from the scope of the present invention.

For example, the shut-down instruction is one example of a power turning off instruction. The sleep state is one example of a power saving state in which some of operations are stopped. The LED is one example of an indication part that indicates that the operation part is currently carrying out a process. The body part 2 is one example of a body apparatus. The operation part 3 is one example of an information processing apparatus.

Further, the image processing apparatus 1 is one example, and there are various examples of system configurations according to applications and purposes of the systems.

The present application is based on and claims the benefit of priority of Japanese Priority Application No. 2013-095463, dated Apr. 30, 2013, the entire contents of which are hereby incorporated herein by reference.

What is claimed is:

1. An information processing system comprising:
an operation part that includes a user input device which receives an operation performed by a user; and
a body part that operates based on a request from the operation part, wherein
the body part includes a body part controller that,
when the user performs a power turning off operation, the body part transmits a power turning off instruction to the operation part, and shuts down the body part itself, and
when the user performs a power turning on operation, the body part transmits a start up notification to the operation part, and starts up the body part itself, and
the operation part includes a power control part that, when receiving the power turning off instruction from the body part controller, reboots the operation part and causes the operation part to stand by in a power saving state in which some of operations of the operation part are stopped, and, when receiving the start up notification from the body part controller, causes the operation part to return from the power saving state and connect to the body part, wherein the body part controller and the power control part implement various processes by executing programs on respective computers.

2. The information processing system as claimed in claim 1, wherein
when receiving the start up notification from the body part controller before the operation part stands by in the power saving state, the power control part causes the operation part to stand by in the power saving state and return from the power saving state.

3. The information processing system as claimed in claim 1, wherein
when receiving the start up notification from the body part controller before the operation part stands by in the power saving state, the power control part does not cause the operation part to standby in the power saving state.

4. The information processing system as claimed in claim 1, wherein
the operation part includes an indication part that indicates, from a beginning of being rebooted until the operation part begins standing by in the power saving state, that the operation part is currently carrying out a process.

5. The information processing system as claimed in claim 1, wherein
an operating system that is independent from the body part is installed in the operation part and the operation part operates independently from the body part.

6. The information processing system as claimed in claim 1, wherein body part includes at least one of a scanner and a plotter.

7. The information processing system as claimed in claim 1, wherein the operation part includes at least one of a display and an operating system.

8. An information processing apparatus which receives an operation performed by a user and, based on the operation, sends a request for causing a body apparatus to operate, the information processing apparatus comprising:
a body apparatus controller that,
when the user performs a power turning off operation, the body apparatus controller transmits a power turning off instruction to the information processing apparatus, and shuts down the body apparatus itself, and
when the user performs a power turning on operation, the body apparatus controller transmits a start up notification to the information processing apparatus, and starts up the body apparatus itself, and
a power control part that, when receiving the power turning off instruction from the body apparatus controller, reboots the information processing apparatus and causes the information processing apparatus to stand by in a power saving state in which some of operations of the information processing apparatus are stopped, and, when receiving a start up notification from the body apparatus controller, causes the information processing apparatus to return from the power saving state and connect to the body part, wherein the body part controller and the power control part implement various processes by executing programs on respective computers.

9. A start up control method which is executed by an information processing system that includes an operation part having a user input device that receives an operation performed by a user and a body part that operates based on a request from the operation part, the start up control method comprising:
receiving a power turning off instruction from the body part, shutting down the body part itself and rebooting the operation part;
causing the operation part to stand by in a power saving state in which some of operations of the operation mart are stopped;
receiving a power turning on operation from the body part and starting up the body part itself; and
receiving a start up notification from the body part and causing the operation part to return from the power saving state and connect to the body part, wherein the body part controller and the power control part implement various processes by executing programs on respective computers.

* * * * *